INVENTORS:
Hugh F. Frohbach
Albert Macovski
By Smyth, Roston & Pavitt
Attorneys

INVENTORS:
Hugh F. Frohbach
Albert Macovski
By Smyth, Roston & Pavitt
Attorneys

INVENTORS:
Hugh F. Frohbach
Albert Macovski
By Smyth, Roston & Pavitt
Attorneys

INVENTORS:
Hugh F. Frohbach
Albert Macovski
By Smyth, Roston & Pavitt
Attorneys

United States Patent Office 3,371,156
Patented Feb. 27, 1968

3,371,156
TELEVISION RECORDING SYSTEM HAVING AUDIO SIGNALS RECORDED DURING HORIZONTAL BLANKING INTERVALS

Hugh F. Frohbach, Sunnyvale, and Albert Macovski, Palo Alto, Calif., assignors to Minnesota Mining and Manufacturing Company, St. Paul, Minn., a corporation of Delaware Filed Jan. 23, 1964, Ser. No. 339,790
20 Claims. (Cl. 178—6.6)

ABSTRACT OF THE DISCLOSURE

Video and audio signals are recorded along a spiral track on a disk in that the audio information is sampled during each blanking pulse period but recorded only during a fraction of the blanking pulse period so that audio recordings in juxtaposed blanking pulse periods do not register in radial direction.

The present invention relates to a system for recording information, such as video and audio information, on one and the same storage medium, such as a disk, and for retrieving audio information therefrom.

In recent years, systems have been devised which record high-frequency information on a storage medium and provide a subsequent reproduction of the information from the storage medium. For example, signals representing an image being viewed and the sound emanating from the environment of the image have been recorded on a magnetic type. Also, signals have been recorded on storage media to represent different scientific and mathematical information, including the readings of instruments and the values obtained from computations performed by digital computers.

For the recording of high-frequency information, the systems now in use generally employ magnetic tapes as the storage medium. These tapes have proved fairly successful in recording signals representative of information and in obtaining the reproduction of the information. However, the magnetic structure of the tape limits the fidelity of the recording and reproduction so that the magnetic tapes have to be manufactured with considerable precision. The information recorded on the magnetic tapes also has a limited density of information so that a relatively great amount of tape is required to store information such as that required for a television program having a duration of one-half an hour or an hour. The limited density of information packing on the tape has resulted from limtiations in the speed of response of the magnetic transducer heads which are disposed in contiguous relationship to the tape.

In the systems now in use, the transducer head is generally disposed adjacent to the tape to record information in magnetic form on the tape and to reproduce the magnetic information as electrical signals from the tape. The adjacent relationship between the transducer head and the tape occasionally causes the tape to rub against the head, so that magnetic particles become removed from the tape and are deposited on the head to affect the operation of the head. The magnetic particles on the tape tend to produce an abrasive action on the head, thereby permanently affecting the response characteristic of the head.

It is also difficult to use a magnetic tape as a master for the reproduction of a large quantity of identical tapes because of the wear on the tape and the adjacent heads and because of the considerable length of tape required for the master. It would, therefore, be more desirable to use disks as the master, since they tend to store information in a more compact form than tapes. However, the disk systems of the prior art have generally involved a groove cut in a disk of plastic material, with variation in the walls of the groove representing the electrical informaiton.

The disk systems of the prior art have had certain important deficiencies. For example, the reproducing means has generally been in contiguous relationship with the disk. Actually, the reproducing means has constituted a needle which has contacted a groove in the disk to reproduce the information on the disk. This contact between the needle and the groove has tended to wear the disk after the disk has been used several times.

This invention now relates to a system which uses a disk as the storage medium and which is responsive to incoming information so as to vary the light-transmission characteristics of the disk in accordance with such information and to obtain a recording of the information on the disk. For example, the light-transmission characteristics of the disk are varied in a spiral track during the recording operation by an electron beam whose characteristics are controlled by signals representative of the incoming information. By way of illustration, the intensity of the electron beam may be varied by adjusting the potential on the grid of an electron gun in accordance with the characteristics of the information to be recorded. Since the electron beam is projected toward the disk from a position removed from the disk, no frictional forces are produced on the disk by the transducer action.

The recording system improved by the present invention provides means for recording information on the disk in a spiral track having a constant pitch. A driving means is provided to move the disk along a radial line extending from the center of rotation of the disk. As the disk is moved along the radial line, the disk is also rotated at a constant speed past an electron beam which is maintained at a substantially constant position. The combination of the movement and rotation of the disk past the stationary electron beam produces a spiral track on the disk.

The driving means preferably includes a coarse control of the radial movement of the disk relative to the beam, so that the information becomes recorded on the beam at a substantially constant rate. A fine control is also provided which corrects for instantaneous variations in the radial movement of the disk. This is accomplished by deflecting the electron beam in accordance with instantaneous changes in the speed at which the disk is moved radially.

Reproduction of the signals from the disk is accomplished by directing a light beam at the disk and by modifying the light beam in accordance with the light-transmission characteristics previously provided at successive positions on the spiral track on the disk. The modified light beam is detected to obtain a recovery of the information previously recorded on the disk. The information on the disk can be reproduced without having any members directly engage the disk. In this way, no wear is produced on the disk during the reproduction of the information on the disk. The reproducing system has been disclosed and claimed in copending application Ser. No. 181,392, filed on Mar. 21, 1962, by Wayne R. Johnson and assigned of record to the assignee of this application.

One of the problems encountered in the preparation of recording disks of the character described is to be seen in that the same disk should contain video as well as audio information, whereby, of course, strict synchronism is to be observed. One obvious method could be to provide parallel audio and video tracks respectively inscribed by two such beams, one being audio-modulated, the other being video-modulated and inscribing interleafed spirals. This method, however, is not feasible because an undue amount of recording space would be required for the audio information. Similar recording space for audio and video signals is essentially not needed.

It is thus an object of the present invention to provide a recording system operating so as to use for audio recording the track portions in the video recording track allotted for the recording of synchronization and blanking pulses, for example, the horizontal blanking pulses.

It is a further object of the present invention to record audio information during the video blanking period without incurring cross talk during play back, even if the reproduction of the video recording is carried out by scanning two or even more parallel video tracks simultaneously.

With reference to this latter object, it should be borne in mind that the video information, as it is recorded line by line and frame by frame in the spiral track, is synchronized to the rotation of the disk in such a manner that a spiral-track portion corresponding to one complete disk revolution contains one frame. Accordingly, in such a track portion of precisely 360° angular length, there are recorded 525 horizontal sync and blanking signals. Track segments of neighboring tracks pertain to the same scanning spot on the video screen of two succeeding frames and thus have recorded very similar information, because there is little change from frame to frame. Of course, all of the sync and blanking pulses pertaining to the same screen line of all the frames recorded are recorded in radially aligned relationship. Hence, any recording made of a blanking pulse is juxtaposed to the recordings of two blanking pulses respectively pertaining to the preceding and the subsequent frame. Utilization of the blanking-pulse recording space for additional recording of audio signals is liable to incur cross talk. In case multiple-track scanning is desired, such cross talk of the audio information recorded in such aligned sync-pulse track portions has to be suppressed or avoided.

It is a further object of the present invention to prevent audio signals from being recorded in juxtaposed portions of neighboring track portions.

According to one aspect of the present invention in a preferred embodiment thereof, it is suggested that audio information be recorded by means of the following system:

A gating network is interposed between the source of audio signals and a recording-producing unit, which gating network permits transfer of audio signals for limited and definite periods of time only. In particular, the gating network forms discrete audio signal pulses for recording. The gating network responds to the video horizontal blanking pulses; for controlling the audio recording during "$n$" succeeding horizontal blanking pulses, there will be selected a time interval having the duration "$t$" of about $1/n$ of the blanking period "$T$." Thus, "$T=nt$." More particularly, the gating network is controlled so that, during a first blanking period, audio information can be recorded for a time period "$t$" commencing with the blanking period. During the next blanking period, audio information will be recorded also for a period of time "$t$," but commencing at the time "$t$" after commencement of the blanking period. The third audio signal pulse is formed during the third blanking period, at a time commencing "$2 \cdot t$" after the commencement of this third blanking period, again to last for a period "$t$." The "$n^{th}$" recording is carried out during the "$n^{th}$" blanking period, to commence "$(n-1)t$" after commencement thereof, and lasting for "$t$" seconds. The "$n+1^{th}$" recording is carried out during the "$n+1$" blanking period, to commence directly therewith, etc.

From a different point of view, the gating network, controlling audio information transfer for recording, includes means to define "$n$" trains of time intervals, each interval having a duration of "$T/n$" and each train having a rate frequency of precisely video line frequency, so that during each blanking period there is one interval per train and during one horizontal blanking period there will be a sequence of "$n$" such intervals, each one pertaining to a different train. Gating is carried out in respectively two successive blanking periods during time intervals pertaining to different trains, preferably having a phase different by one time interval.

According to a further aspect of the present invention, it is suggested to provide a gating- and audio-signal transfer system of the character described for selective connection between a source of audio signals and a recording unit and between an audio-reproducing unit and a loud-speaker.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

Figure 9:
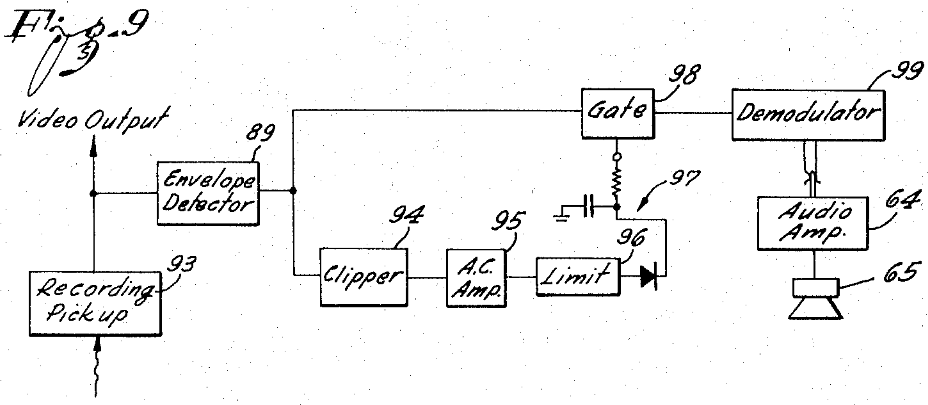
FIG. 9 illustrates a block diagram of a simplified audio read-out system.
Figure 11:
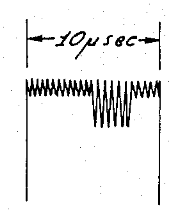
Figure 12:
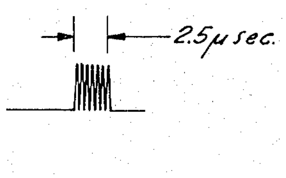
Figure 13:
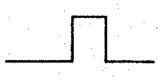

FIGS. 11, 12, and 13 are pulse diagrams of pulses occurring in the system illustrated in FIG. 9.

Figure 1:
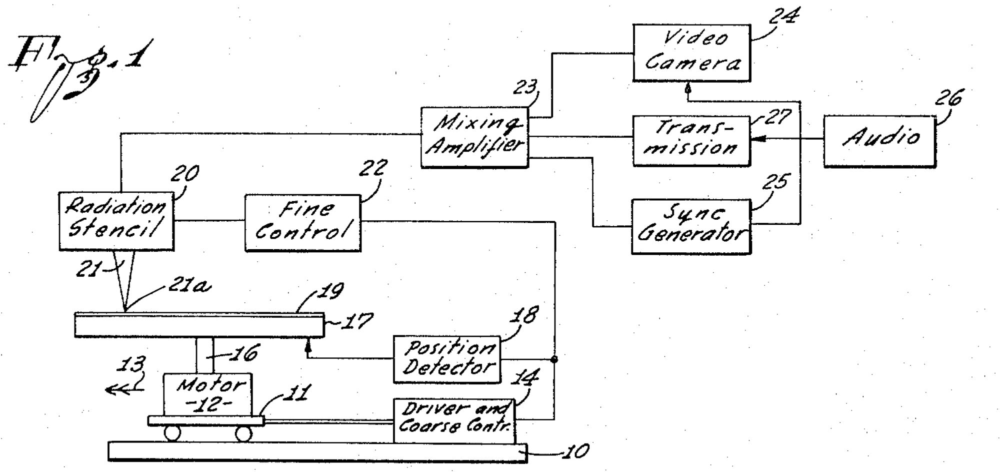
FIG. 1 illustrates somewhat schematically a recording system for concurrently recording video and audio signals, which system is improved by the present invention.

Proceeding now to the detailed description of the drawings, FIG. 1 shows a block diagram of a video-audio recording system incorporating the features constituting the present invention. On a base 10 constituting, for example, a sliding bed, there is provided a carriage 11 supporting a motor 12 to be moved in the direction of double arrow 13. The carriage 11 is being driven by a driver 14 mounted on base plate 10 and linked to carriage 11 through a driving linkage 15, thus establishing the driving connection.

Motor 12 itself has an upwardly directed shaft 16 driving a horizontally extending turntable 17.

There may be provided a position detector 18, scanning appropriate identification markers on turntable 17 or markers rotating in synchronism with turntable 17. Position detector 18 feeds control signals to the driver 14, for example, for purposes of establishing a coarse control of this driver with regard to the transmission of movement to carriage 11.

During the recording operation, motor 12 rotates turntable 17, and driver 14 moves carriage 11 linearly along a straight line.

A recording disk 19 is placed on turntable 17, preferably of the type carrying a photographic layer at its top. The backing member of recording disk 19 may be transparent, so that any exposure of the photographic layer to a recording beam of radiation alters the rate of transmission for light in an area exposed to such a radiation beam.

In order to inscribe a recording track on disk 19, and particularly the photographic layer thereon, there is provided a stationary source of radiation 20 directing a beam 21 in a vertical direction towards the photographic layer of recording disk 19. Beam 21 is being focused onto this photographic layer so as to define a spot 21*a* thereon. The source of radiation 20 could also be designated a radiation stencil, and it includes the source of radiation proper, the focusing means, and means for controlling the intensity of the beam.

In the preferred form of practicing the invention, this source of radiation 20 will comprise an electron gun, including the necessary control and focusing electrodes. Focusing may be had electrostatically and/or electromagnetically. In this case, the beam 21 is constituted by a stream of focused electrons, with the focusing being adjusted to the plane of extension of the photographic layer on recording disk 19. Of course, in this situation the entire arrangement has to be mounted inside of a vacuum in order to avoid scattering of the electrons constituting beam 21.

Radiation source or stencil 20 may also comprise the light source appropriately focused by lenses. Since the recording track to be produced is preferably of very small width, i.e., in the range of one micron, one might employ with advantage a laser as a radiation source.

There may be provided a fine control network 22 altering the direction of focusing of beam 21 in response to an error signal developed by position detector 18.

It will be appreciated that the spot 21*a* of radiation beam 21 on recording disk 19 will inscribe a spiral track in the photographic layer, since motor 12 and driver 14 impose a composite rotary and linear movement upon turntable 17.

Radiation stencil 20 receives a composite signal to be recorded from a mixing amplifier network 23, which might include an R-F carrier source with modulator. This network 23 receives a video signal from a video camera 24; it further receives, from scanning and synchronization unit or generator 25, synchronization and blanking pulses and signals for recording same. It is, of course, possible to have the synchronization generator only operating the video camera, so that the video camera output signal already includes recordable synchronization and other control pulses. Finally, there is provided a source of audio signals 26, for example, a microphone directed towards the object observed by the video camera. The audio source 26 may also include, for example, a source of background music or any other sound to be recorded as sound in connection with the recorded video signal.

The present invention relates to a system 27 of controlling the transmission of the audio signals from source 26 to the radiation stencil 20 in synchronism with selected control pulses derived from generator 25, so that audio and video signals are being recorded on a common track on recording disk 19. Particularly the audio signals are to be recorded in track portions serving as a recording for control signals such as the horizontal blanking pulse or the horizontal sync pulse.

Figure 2:
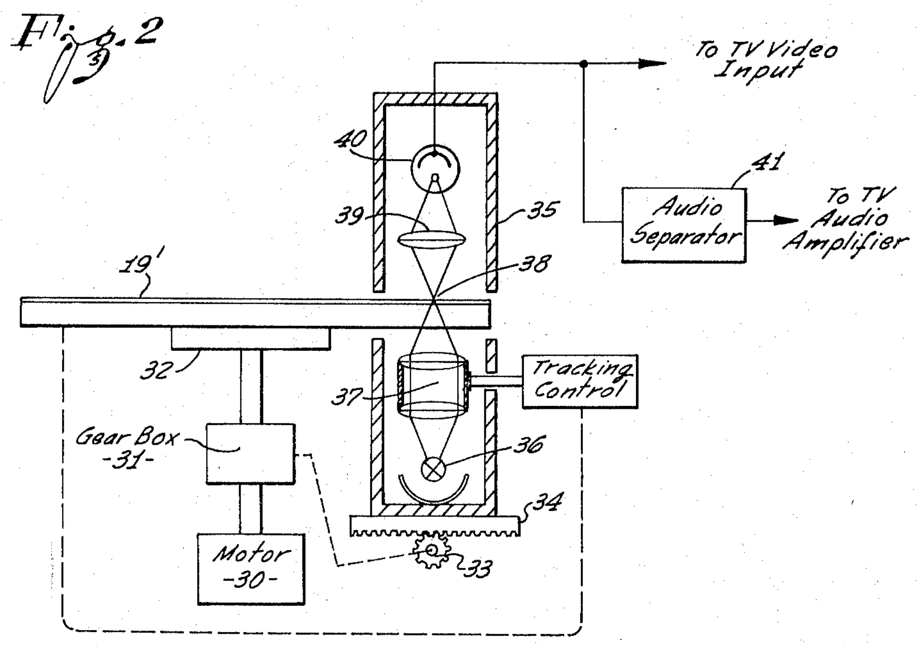
FIG. 2 illustrates somewhat schematically a play-back system for a recording produced with the system shown in FIG. 1.

In FIG. 2, there is shown schematically a video-phonograph usable as an attachment to a conventional TV set. This record player includes a motor 30 feeding a rotary output to a gearbox 31, from which a turntable 32 is being driven in a manner known for conventional phonographs. However, it should be noted that precision drives are necessary for use in the present record player, since a highly accurate, constant speed and very accurate tracking are required for adequate reproduction of such a composite video-audio recording.

A recording disk 19' is seated on turntable 32, and it shall be assumed that recording disk 19' was produced with the aid of the recording system explained with reference to FIG. 1. Of course, the photographic layer or a copy thereof as mounted on recording disk 19' has been developed after recording, and it includes a spiral track defined by contiguous areas of variable transmission and varying degree of apaqueness.

A pinion 33 is also linked to gearbox 31, and it meshes with a rack 34 for driving a scanning or pickup unit 35. This unit 35 includes a housing, receiving a portion of disk 19' but clearing same. There is furthermore mounted a light source 36 directing a light beam towards a condenser system 37, which focuses this light beam as a scanning spot 38 into the plane of the photographic layer of recording disk 19'. Light spot 38 is being modulated by the spiral track, and the modulated light is observed by a lens 39 directing a modulated light beam into a photoelectric receiver 40. The photoelectric receiver 40 develops an electrical signal representing the recorded video and audio information. This composite signal can then be fed directly to the TV signal input terminal for reproduction in a conventional manner. The occurrence of recorded audio signals during the horizontal sync or blanking periods does not influence proper reproduction of the video signals or formation of synchronization signals in the conventional TV set.

The video-audio reproducing unit described, and to be used as an attachment for a conventional TV set, furthermore includes an audio-separator unit 41 connected to the output side of photoelectric receiver 40; and the output of separator 41 may be fed either to a separate loudspeaker pertaining to the record player, or it may be hooked up with the TV set and particularly to the input side of the TV audio amplifier or loud-speaker.

The audio-separator unit 41 incorporates features of the present invention and will be described more fully below. In particular, it will be shown that unit 27, of FIG. 1, and unit 41, of FIG. 2, include essentially similar elements.

Figure 3:
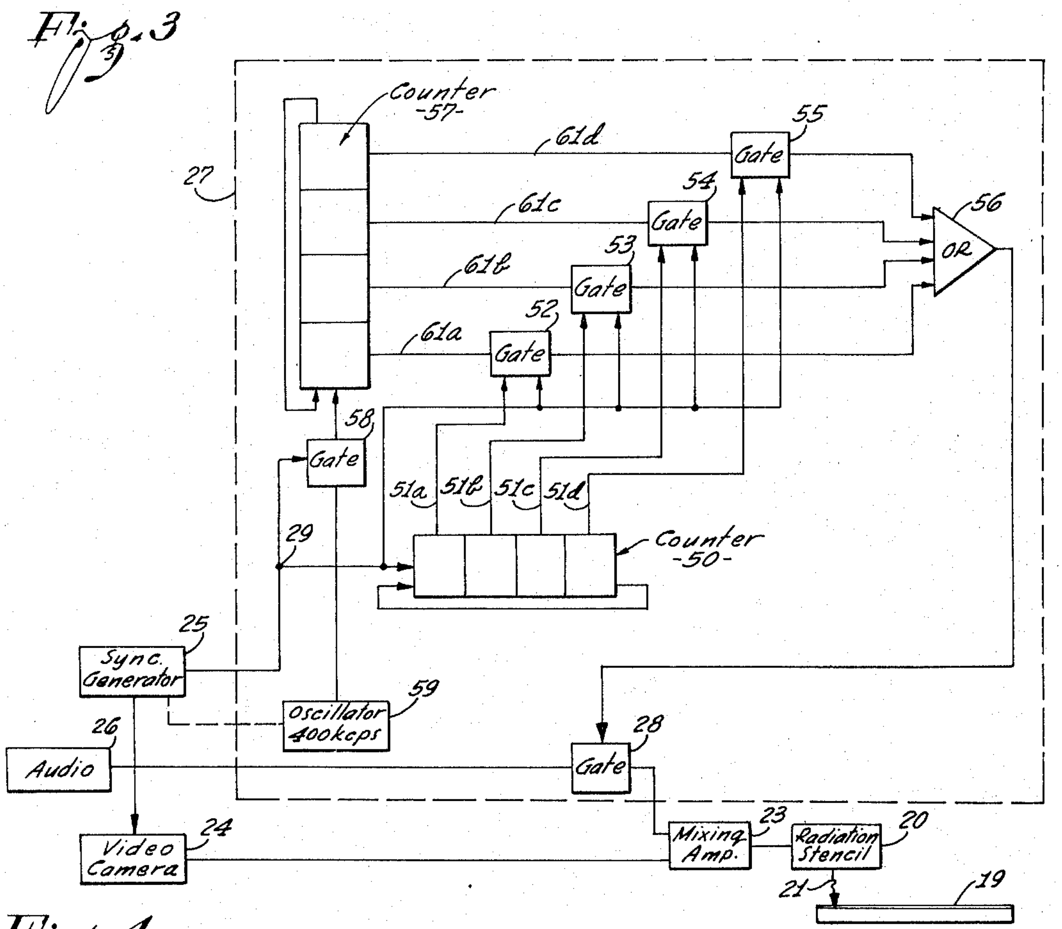
FIG. 3 illustrates a block diagram for controlling the recording of audio signal pulses during discrete periods of time.

Proceeding now to the description of FIG. 3, there is shown in block diagram an audio signal-pulse formation and transfer network, provided for controlling the transfer of signals developed in a source of audio signals, such as microphone 26, and to be fed to the mixing amplifier 23 for passage into the radiation stencil 20. Such a network is illustrated as a single block and denoted with reference numeral 27 in both FIG. 1 and FIG. 3, now to be described more fully with reference to the various circuit elements and components illustrated in FIG. 3. There is first provided a gate 28 having its respective signal input terminal directly connected to audio signal source 26. Preferably, audio signals are continuously applied to this signal input terminal of gate 28. The signal output terminal of gate 28 is connetced to one input terminal of mixing amplifier 23. Which audio signals are permitted to pass into mixing amplifier 23 is determined by the duration and respective occurrence of gating signals to be applied to the gating terminal of gate 28.

The generator 25 for developing and forming synchronization and blanking pulses may have a special output terminal 29, to which are applied the horizontal blanking pulses developed by and in generator 25. For purposes of conveniently describing the invention, it should be mentioned that the blanking pulses and the blanking periods are being used for audio recording. However, it is within the scope of the invention merely to use the horizontal sync pulses and the respective duration thereof for purposes of audio recording. The network as such will not be altered and can be used in either case. The only adaptation to be made amounts to suitable selection of different time delays and characteristic time intervals and frequencies.

The blanking pulses delivered to terminal 29 are being fed to a four-stage ring counter 50, and they are being counted accordingly. This ring counter 50 can be of conventional design, and it may comprise four interconnected flip-flops defining altogether four output channels 51*a*, 51*b*, 51*c*, and 51*d*. The connection is to be made so that each such channel is being activated for a period of time commencing with the leading edge of one blanking pulse and terminating with the leading edge of the next blanking pulse. There are provided four gates 52, 53, 54, and 55, each having two gating terminals, one of which is respectively connected to the counter output channels 51a through 51d, while the respective second gating terminal of each gate 52, 53, 54, and 55 connects directly to terminal 29. The gating connection illustrated here is not critical, and it is of importance that any one of the gates 52, 53, 54, and 55 is being gated-open only for the duration of a blanking pulse. The employment of a ring counter for such gating control insures that the gates are cyclically opened, one at a time, and during succeeding blanking pulses. Alternatively, each gate 52 to 55 could be of the single-input type with an "AND" circuit connected thereto, combining the signal developed at the counter and the signal as it is applied at terminal 29 so as to form a gating signal.

The four gates 52 to 55 have their respective signal output terminals connected to the input terminals of an adding network such as an "OR" circuit 56 having its output terminal connected to the gating terminal of gate 28. Accordingly, whatever signal is being developed at any output terminal of the gates 52, 53, 54, and 55 is being applied as a gating signal to gate 28.

A second ring counter 57 receives its counting signals from a gate 58 having its input side connected to an oscillator 59 producing oscillations at 400 kilocycles. This oscillator 59 may be phase-locked to sync generator 25, so that at the beginning of each blanking-pulse period there is a passage through zero of the output of oscillator 59. Gate 58 is controlled by the blanking pulses themselves, and the gating terminal of gate 58 is connected to terminal 29 accordingly.

Ring counter 57 has four stages which are being activated successively by a half wave of each oscillation drawn from oscillator 59 and permitted to pass through gate 58. Since the blanking pulse has a duration of approximately 10 microseconds and since the wave period for each oscillation from oscillator 59 is 2.5 microseconds, four pulses per blanking-pulse period are permitted to pass through gate 58, so that during one blanking period all four stages of counter 57 are being activated. The counter 57 may comprise four flip-flops, and the connection is being made so that each stage remains activated for the full 2.5 microseconds. Counter 57 respectively feeds its activating output signals to four channels 61a, 61b, 61c, and 61d, forming the signal input for gates 52, 53, 54, and 55, respectively.

The device as described thus far operates as follows. During recording, audio signals are continuously developed in audio source 26, and the video camera 24 takes TV pictures in the conventional manner. Accordingly, the sync generator 25 develops all the necessary sync signals, including the blanking pulses, regularly and cyclically appearing as control voltage blocks at terminal 29. Concurrently, oscillator 59 produces its 400-kilocycle output.

The blanking pulses developed at terminal 29 are being used in a threefold manner. First, the blanking pulses furnish the counting signals for ring counter 50, activating counter output channels 51a, 51b, 51c, and 51d one after another, and with a cycle frequency corresponding to one-fourth of the line frequency. Secondly, the blanking pulses operate as gating pulses for all of the gates 52, 53, 54, and 55, but only one gate at a time is being opened during any blanking pulse. Thirdly, the blanking pulses serve as gating signals for gate 58, so that during any blanking-pulse period all four counter stages of counter 57 are being actuated.

One complete operating cycle will best be understood with reference to FIG. *5a*. Assuming that momentarily blanking pulse "*a*" is being developed by generator 25 to actuate the first stage of counter 50, accordingly gate 52 is gated-open for the duration "T" of a blanking pulse "*a*." The three other stages of counter 50 remain inactive, so that gates 53, 54, and 55 remain closed. Concurrently, four oscillations are permitted to pass from oscillator 59 through gate 58 to successively activate the four stages of counter 57. However, only the activation of the first stage, that is to say, the counting of the first of the four 400-kilocycle waves, is effective in passing from channel 61a through the open gate 52 into "OR" circuit 56 to gate-open the gate 28. Accordingly, audio signals will pass from audio source 26 through gate 28 and to the stencil 20 for a period of time "*t*" indicated by the hatched lines of FIG. *5a* and during the first blanking period "*a*."

During the succeeding period of video recording, all of the gates 28, 52, 53, 54, 55, and 58 remain closed.

During the next blanking period "*b*," the counter 50 shifts into its second state and gate 53 is being gated-open. Gate 58 is opened again, and four 400-kilocycle waves are permitted to pass for running counter 57 through another cycle. The first one of such waves, though activating the first stage of counter 57, remains ineffective, since gate 52 is closed. The second one of the 400-kilocycle waves is now effective to actuate channel 61b, and gate 28 remains open for a period of time also indicated by hatched lines during blanking period "*b*."

The formation of the two following gating pulses can easily be derived from FIG. *5a*. The third blanking period "*c*" causes a short pulse to be developed at the output side of gate 54 during a time interval corresponding to the third 400-kilocycle wave permitted to be counted in counter 57. The fourth blanking period "*d*" causes the fourth 400-kilocycle wave to serve as a gating pulse for gate 28.

Thus, the four audio signal pulses in blanking periods "*a*," "*b*," "*c*," and "*d*" appear respectively in the first, second, third, and fourth quadrant of such blanking periods.

FIG. *5a* can also be construed as a schematic development of a first track portion as it is inscribed by stencil 20 on recording disk 19. The hatched blocks, as shown in FIG. *5a*, thus do not only illustrate the respective time intervals used for recording, but can also be interpreted as denoting the track portions allotted for audio recording.

As outlined above, the video recording on disk 19 is being made in that one complete frame comprising 525 lines is recorded during one revolution of recording disk 19. Accordingly, all recorded blanking pulses appear on disk 19 in radially aligned relationship. FIG. *5b* now describes the audio recordings made during the respective next disk revolution. FIG. *5c* illustrates the recordings made for the same three lines during the third frame, and FIG. *5d* illustrates the next following recording track portion. There are thus shown four radially aligned blanking-pulse track portions or time intervals, but no audio recording is juxtaposed to any other audio recording.

The purpose of this provision is to be seen in that, during play back, the scanning beam does not have to be restricted to the scanning of but one track portion, but it may cover two, three, or even four track portions. Since four such track portions, as they are being scanned simultaneously, represent the same line or the same picture spot during four sequential frames, there is little change in the respective video information; but the audio information, as recorded in neighboring blanking pulses, may materially differ from track to track. The inventive recording method insures that only one audio recording at a time can be read out so as to avoid cross talk.

Proceeding now to the description of FIG. 4, there is illustrated a network which can be employed with advantage for reproducing a recording made with a system described with reference to FIG. 3.

It should be noted as an important feature of the present invention that the basic transfer network for audio signals is similar to that used during recording.

There is first provided a video-audio recording detector 62, which detector may, for example, include a photoelectric receiver 40, as shown in FIG. 2, with all the prephotocel accessories. The composite video-audio signal developed in detector 62 will first be fed to an envelope detector 63 to eliminate the RF frequency. A gate 28' has its signal input terminal connected to envelope detector 63. The output side of gate 28' is connected to an audio amplifier 64, which, in turn, is connected to a loud-speaker 65. Audio amplifier 64 may be a member of a record player, or one can use the audio amplifier in the TV set to which the record player is an attachment. The same holds true for loud-speaker 65.

The gating terminal of gate 28' connects to the output side of an "O" gate 56', having its four input terminals connected to the output sides of gates 52', 53', 54', and 55'. The signal input sides of the latter four gates respectively connect to the four stages of a ring counter 57' receiving its counting signals through a gate 58' from a 400-kilocycle osciliator 59'. The gating signals for gates 52' through 55' are developed by a four-stage ring counter 50' which has its counting signal input terminal connected to the output side of a clipper and blanking-pulse separator 66 receiving its input pulses from envelope detector 63. Counter 50' thus receives the blanking pulses as they are being read out by detector 62 after elimination of the RF frequency. The same blanking pulses are being fed to gate 58'.

During play back, the blanking pulses appear merely as control signals at the output side of separator 66, to be counted by counter 50' and to open gate 58', so that during each blanking period all four stages of counter 57' are being activated. Accordingly, the counter 57' furnishes four successive read-out pulses, each having a duration of 2.5 microseconds. However, during each blanking period, only one read-out pulse is permitted to open gate 28'.

Figure 4:
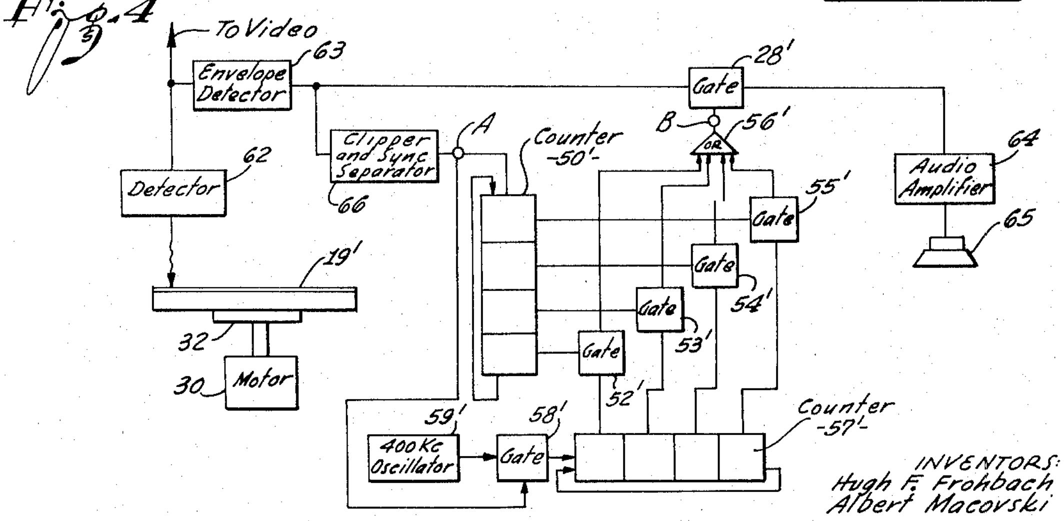
FIG. 4 illustrates a block diagram of a control system to retrieve audio signals from a composite read-out, video-audio signal.

It will be noted that the network described in connection with FIG. 4 is capable of reading out the audio information of any of the tracks illustrated in FIG. 5. The gates 52', 53', 54', and 55' do not have to be gated-open additionally by each blanking pulse because, within a time interval commencing with the leading edge of one blanking pulse and extending to the leading edge of the next blanking pulse, only one audio recording will be read out by detector 62. Furthermore, this audio recording is to be found only during a blanking-pulse period; thus, it is not necessary to restrict the gating of any of the gates 52' through 55' to the blanking period. Effective read-out occurs only during a read-out pulse drawn from any of the stages of counter 57', and this counter 57' is activated only during a blanking period. This accounts for the simplification of the network controlling the read-out process as compared with the otherwise similar network governing recording and as illustrated in FIG. 3.

Figure 6:
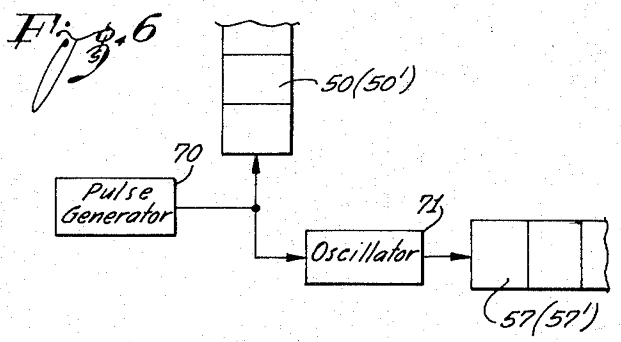
FIG. 6 illustrates a block diagram of a modification of the systems shown in FIGS. 3 and 4.

FIG. 6 illustrates a slight modification of the control and transfer networks described above. Block 70 may comprise either the sync- and blanking-pulse generator, such as 25 in FIG. 3, or it may comprise the blanking-pulse separator, such as 66 in FIG. 4. In any event, network 70 feeds pulses of blanking-period duration as counting pulses to counter 50 or 50'. The blanking pulses are also being fed to a normally inactive and blocked oscillator 71 permitted to operate only upon occurrence of and for the duration of any blanking pulse drawn from source 70. This oscillator 71 produces waves of a frequency of 400 kilocycles to be counted in counter 57 or 57'. Otherwise the operation is similar, as outlined above.

Figure 7:
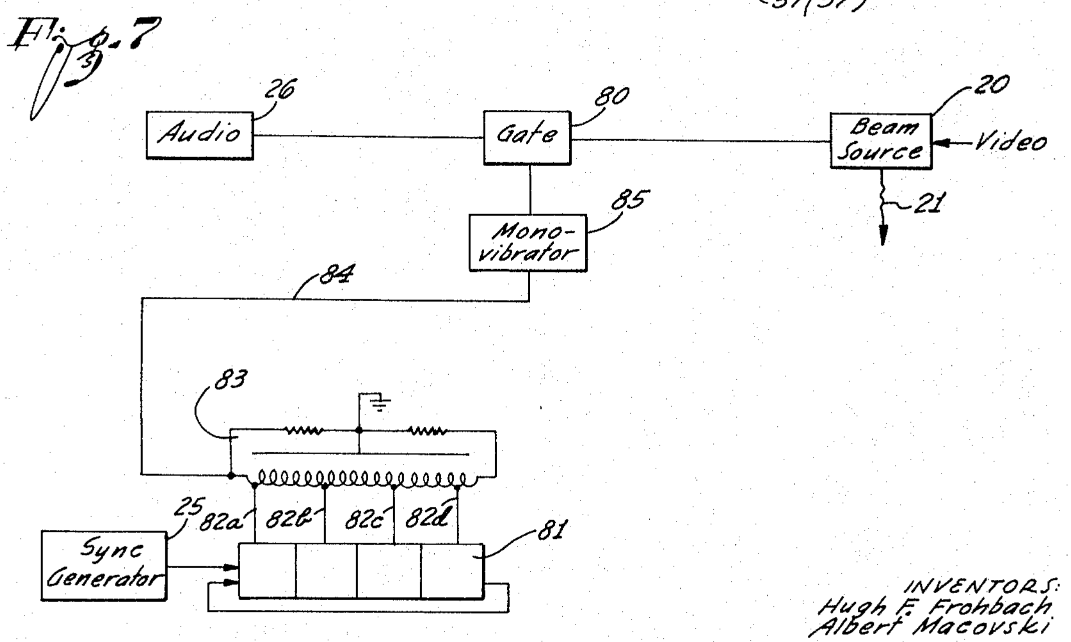
FIG. 7 illustrates a block diagram of another embodiment of the present invention.

Proceeding now to the description of FIG. 7, there are shown only the audio signal source 26 and the beam control source 20 for producing a recording beam 21, with a gate 80 interposed in the connection. A sync generator 25 again furnishes pulses representing duration and rate of occurrence of the video blanking signals. These signals are being fed to a counter 81 having four stages connected to establish a ring counter. Each one of the four stages has an output line 82_a_, 82_b_, 82_c_, and 82_d_, respectively.

There is next provided a delay line 83 having the said four output lines 82_a_ through 82_d_ as four distinct input terminals, whereby a total delay produced by the delay line 83 is 7.5 microseconds. This delay is particularly applicable for a pulse appearing at output line 82_d_. A pulse appearing at line 82_c_ is being delayed by 5 microseconds; a pulse fed into a line 82_b_ is being delayed by 2.5 microseconds; and a pulse fed to line 82_a_ is not delayed at all.

The four lines 82_a_ through 82_d_ connect to the stages of counter 81 in such a manner that output pulses are being produced only during the initial activation of any stage. Accordingly, the lines 82_a_ through 82_d_ and the delay line 83 will thus transmit discrete pulses of short duration, each occurring at the beginning of a blanking-pulse period or interval, or with 2.5, 5, or 7.5 microseconds of delay with respect thereto. Reference numeral 84 designates the output line of delay line 83 feeding any pulse permitted to pass through the delay line as trigger pulse to a monostable vibrator 85.

The monostable vibrator has a characteristic oscillation period of 2.5 microseconds. The output side of monovibrator 85 is connected to the gating terminal of gate 80. During operation, four successively appearing blanking pulses furnish trigger pulses in line 84, whereby the first of such trigger pulses occurs directly with the appearance of the first blanking pulse; and the second, third, and fourth trigger pulses in line 84 are, respectively, delayed by 2.5 microseconds, 5 microseconds, and 7.5 microseconds, each measured relative to the leading edge of the second, third, and fourth blanking pulses respectively. The fifth blanking pulse again produces an undelayed trigger pulse in line 84 because the counter 81 is connected to define a ring counter.

Figure 5:
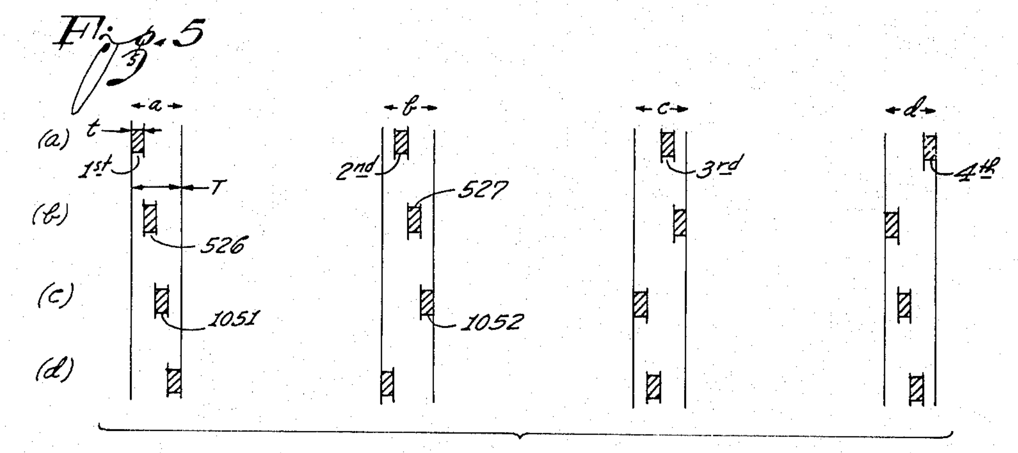
FIG. 5 illustrates schematically the development of parallel track portions containing video and audio signals.

The monovibrator output pulses thus appear at a rate as was outlined above with reference to the output pulses of "OR" circuit 56, and the audio recording is being produced during intervals precisely as outlined with reference to FIG. 5_a_.

Figure 8:
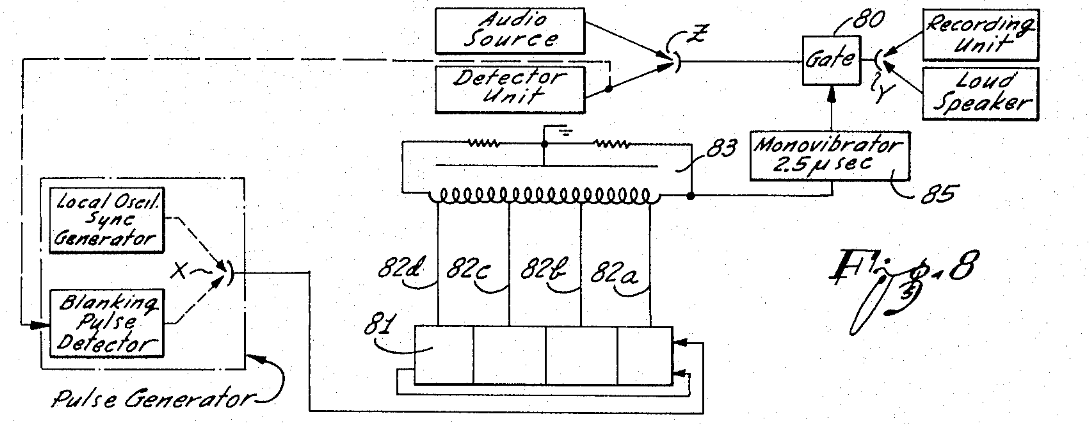
FIG. 8 illustrates a block diagram of a system usable for the production of recording as well as for controlling selective retrieval of audio recordings.

In FIG. 7, a network is shown connected, on the one hand, to sync generator 25 and, on the other hand, to the gating terminal of a gate 80. This network is shown alone in FIG. 8, with a control input terminal "_x_," an information input terminal "_z_," and an output terminal "_y_." The same network can thus be used for purposes of recording as well as reproducing a record. For recording, the pulse generator is constituted by a local oscillator in general and the blanking pulse generator in particular, which is to be connected to terminal "_x_." The information input terminal "_z_" of the gate 80 is connected to the audio source (microphone, etc.), and the information output terminal "_y_" is connected to the recording unit (for example, mixing amplifier 23 and stencil 20 of FIG. 1). For reproduction, terminal "_x_" is connected to the blanking pulse detector, for example, a blanking pulse separator which itself is connected to the detector unit scanning the record. The detector unit itself has its output side connected to terminal "_z_," and a loud-speaker is connected to terminal "_y_."

For recording as well as for reproducing, the gate 80 is open only during those intervals described above, with particular reference to FIG. 5.

Figure 10:
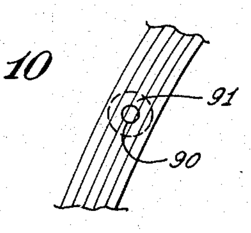
FIG. 10 illustrates a portion of a recording disk with a scanning beam.

Proceeding now to the description of FIGS. 9 and 10, there is illustrated a simplified read-out network for a recording produced with a network designed basically as illustrated in FIGS. 3 or 7. However, it is assumed additionally that the audio recordings are not being made directly, but that the audio signal source such as 26 includes an FM modulator with a single carrier frequency selected in the megacycle range.

This embodiment assumes further that the scanning beam, such as is shown in FIG. 2, results in a focused light spot 38 having a center of high intensity 90, but hardly exceeding the width of a single recording track. This zone 90 of high intensity is surrounded by an umbra 91 of lesser intensity and having a diameter of about four tracks. In this case, the recording pickup or detector device will receive FM signals during each entire blanking period; but there is a strong FM signal only from that one track scanned by spot zone 90, and FM signals of minor strength are being picked up by umbra 91 from the adjoining track portions. Hence, by amplitude discrimination one can pick out the desired FM signal from the desired track.

FIG. 11 illustrates the output pulse furnished by the detector, such as 93, during any blanking period, whereby the proper and desired audio appears recorded in the third quadrant of the blanking period normally monitored by the light spot.

The detector output signal is, therefore, first being fed to a clipper and blanking-pulse separator 94 delivering an output to A.C. amplifier 95, which, in turn, is connected to a limiter 96. Limiter 96 is dimensioned to suppress the signals picked up by the umbra 91, so that an output pulse such as is illustrated in FIG. 12 will appear at the output side of limiter 96. Accordingly, the sequence of unidirectional pulses occurs only when light-spot portion 90 passes across the audio recordings of the track upon which it is centered. A rectifier and filter network 97 eliminates the FM carrier frequency, so that a gating pulse such as is illustrated in FIG. 13 is applied to the gating terminal of gate 98.

The signal input terminal of gate 98 connects to the detector 93 through an envelope detector 89 for R-F elimination, and gate 98 is being opened only for those periods of time in which the audio signal as picked up by detector 93 is comparatively strong. The output side of gate 98 connects to an FM demodulator 99, which, in turn, connects to audio amplifier 64 and loud-speaker 65, as aforedescribed.

The above-described embodiments operate with audio signal pulses having a constant duration "$t$," such as 2.5 microseconds. This provision is not essential but, of course, constitutes the preferred form of practicing the invention. It should be borne in mind that a horizontal blanking-pulse period of 10 microseconds constitutes an average value, and the blanking period may be slightly shorter or longer from time to time. A longer blanking period has no effect at all on the audio recording. A shorter blanking period affects only the duration of the effective audio signal pulse in the fourth quadrant of the blanking period, which is of little influence on the overall audio recording and reproduction.

Modifications of the above-described embodiments include the provision of dividing the blanking-pulse periods "T" into intervals of a duration other than $$t=\frac{T}{4}$$

As stated above, the general rule requires $$t=\frac{T}{n}$$

with "$n$" not being 3, 5, or 7 or any integral multiple of any of these numbers. If an integral number of frames is being recorded during one disk revolution, then "$n$" must not be equal to such a number. With a 525-line system, the described technique will work with $n=2$, 4, 8, 11, 13, and so on, with $n=2$ or 4 being preferred. Other systems throughout the world are 405, 625, and 819 lines. Only the 625-line system will also work with $n=6$, but all of them will work with $n=2$ or 4. If "$n$" is, for example 2, then counters 50 and 57 will each have to have two stages, and oscillator 59 will produce 200-kilocycle oscillations, etc. In case the shorter horizontal sync period is used for audio recording, the frequency of oscillator 59 will have to be higher accordingly, about 700 kilocycles to 800 kilocycles, if "$n=4$."

The invention is not limited to the embodiments described above, but all changes and modifications thereof not constituting departures from the spirit and scope of the invention are intended to be covered by the following claims.

What is claimed is:

1. A system for recording audio information in a track of video recordings, on a rotating carrier, the combination comprising:
 - a source of blanking pulses;
 - means connected to said source for receiving audio signals to be recorded during periods of time which are fractions of the video blanking period, and forming audio signal pulses accordingly; and
 - means connected to said receiving means for recording a plurality of audio signal pulses on the track within different sections of succeeding blanking periods.

2. A system for recording audio information in a track of video recordings, on a rotating carrier, the combination comprising:
 - a source of blanking pulses;
 - counter means connected to said pulse source for activation therefrom, and defining a plurality of successive time intervals during and within and shorter than any blanking period sequential time intervals as selected follow each other at a period different from the period in between succeeding blanking pulse periods by the duration of at least one selected time interval;
 - means connected to said counter means for defining enabling signals of the duration of said time intervals and occurring at different sections within succeeding blanking periods;
 - a source of audio signals; and
 - recording means connected to said audio source and being responsive to said enabling signals for recording audio signals during occurrence of an enabling signal.

3. In a system for reproducing audio and video information from a rotating disk capable of storing received information, the combination comprising:
 - means for scanning a spiral track on said disk, including means for detecting video signals including horizontal blanking pulses recorded on said spiral track; and
 - means responsive to audio signals as detected by said scanning means during selected time intervals within horizontal blanking-pulse periods only sequential time intervals as selected follow each other at a period different from the period in between succeeding blanking pulse periods by the duration of at least one selected time interval.

4. A system for reproducing audio and video information from a rotating disk capable of storing received information, the combination comprising:
 - means for scanning a spiral track on said disk;
 - means responsive to video signals as detected by said scanning means from said spiral track, there being one video frame recorded during one revolution of said disk;
 - automatic time interval selection means defining time intervals during video blanking periods sequential time intervals as selected follow each other at a period different from the period in between succeeding blanking pulse periods by the duration of at least one selected time interval; and
 - means connected to said selection and said scanning means, for causing audio reproductions during selected time intervals within blanking periods on the same track.

5. A transfer network for the formation of audio signal pulses to be connected between a source of audio signals and a recording unit inscribing a spiral recording track on a rotating storage carrier, the combination comprising:
 - gating means connected with signal input and output terminals to said audio signal source and said recording unit, respectively;
 - means for determining a plurality of series of sequential time intervals;

means defining a sequence of spaced time periods; and means connected to the gating terminal means of said gating means for opening same during any one of said periods for the duration of one of said time intervals, with different time intervals selected for successive periods.

6. A transfer system for transferring recorded audio signal pulses from a recording-reproducing unit to a loudspeaker, the combination comprising:

gating means having its signal input and output terminals connected to said reproducing unit and to said loud-speaker, respectively;

means for determining a plurality of series of sequential time intervals;

means defining a sequence of spaced time periods; and means connected to the gating terminal means of said gating means for opening same during any one of said periods for the duration of one of said time intervals, with different time intervals selected for successive periods.

7. A transfer network for audio signal pulses, to be selectively connected between a source of audio signals and a recording unit and between a loud-speaker and a recording-reproducing unit, the combination comprising:

a gate having its signal input and output terminals connected for audio signal pulse transmission;

first enabling means for forming signals for the duration of video blanking-pulse periods;

means defining a sequence of similar and sequential time intervals within any blanking-pulse periods;

second enabling means connected to said defining means and said first enabling means and being responsive to said formed signals, for the formation of a gating signal during each blanking-pulse period with two gating signals in two succeeding blanking periods occurring during respectively successive time intervals; and means for connecting said second enabling means to the gating terminal means of said gating means.

8. A transfer network for audio signal pulses, to be selectively connected between a source of audio signals and a recording unit and between a loud-speaker and a recording-reproducing unit, the combination comprising:

a source of blanking-signal pulses;

a ring counter having its counting-signal input terminal connected to said source of blanking signals, and defining a plurality of successively activatable output channels;

means including said ring counter for defining a plurality of trains of similar time intervals, with each train recurring at video line frequency, and a group of sequential time intervals, one for each train, occurring during a blanking period; and gating means connected for governing passage of audio signals, and having its gating terminal connected to said defining means so as to permit passage of audio signals during any blanking period for the duration of one of said time intervals, with the time intervals of succeeding blanking periods pertaining to different trains.

9. A transfer network for audio signal pulses, to be selecetivley connected between a source of audio signals and a recording unit and between a loud-speaker and a recording-reproducing unit, the combination comprising:

a gate having its signal input and output terminals connected for audio signal pulse transmission;

first enabling means for forming signals for the duration of video blanking-pulse periods;

means defining a sequence of similar and sequential time intervals within any blanking-pulse periods;

second enabling means connected to said defining means and said first enabling means and being responsive to said formed signals, for the formation of a gating signal, one during each blanking period, with any two respectively succeeding gating signals following each other at a rate different from the rate of the blanking-pulse frequency; and means for connecting said second enabling means to the gating terminal means of said gating means.

10. A transfer network for audio signal pulses, to be selectively connected between a source of audio signals and a recording unit and between a loud-speaker and a recording-reproducing unit, the combination comprising:

a gate having its signal input and output terminals connected for audio signal pulse transmission;

first enabling means for forming signals for the duration of video blanking-pulse periods;

means defining a sequence of similar and sequential time intervals within any blanking-pulse periods;

second enabling means connected to said defining means and said first enabling means and being resposive to said formed signals, for the formation of a gating signal, one during each blanking period, with two respectively succeeding gating signals following each other by a time which corresponds to the blanking-pulse rate period plus one of said time intervals; and means for connecting said second enabling means to the gating terminal means of said gating means.

11. In a system for recording audio and video information, including a rotatably mounted recording disk; having a source of energy directing a recording beam toward a disk; means for controlling relative movement between disk and beam so that the latter inscribes a spiral track upon the former; further having a source of video signals, a sync-pulse generator, and means connected to said signal source and said generator for controlling said beam in accordance with the video signals and sync pulses, there being blanking-pulse periods, the improvement comprising:

a source of audio signals;

means connected to said sync-pulse generator for defining within any blanking-pulse periods a plurality of succeeding time intervals, with any such time interval recurring at a blanking-pulse rate within said blanking-pulse periods; and means connected to said defining means, said source of audio signals, and said beam-controlling means, for transmitting audio signals to said beam-controlling means during one time interval per blanking period, with audio recordings in succeeding blanking periods being made in respectively succeeding time intervals.

12. In a system for recording audio signals on the same track provided for video information and within periods allotted for the recording of blanking pulses, the combination comprising:

means for recording first audio signals during a blanking period for a period of time approximately equal to $10/n$ microseconds, with "$n$" being an integer unequal to 3, 5, and 7, and any integral multiple thereof; and means for recording audio signals again for a similar period of time and commencing 63.5 microseconds after termination of recording of said first audio signals.

13. In a system reproducing audio information from a rotating disk having information stored as permanent modulation of its characteristics, along a spiral track thereon:

detector means for reading said track;

means connected to said detector means and being responsive to succeeding blanking intervals as included in video signals recorded on said disk;

gating means for passing audio signal pulses of a duration shorter than any horizontal blanking period; and delay means for controlling said gating means for passing of audio signal pulses, so that respectively two succeeding audio pulses are passed through during succeeding blanking intervals, with the delay between said two audio signal pulses being unequal to the period corresponding to the video line frequency.

14. In a recording system which uses a rotating disk capable of storing information as permanent modulation of its characteristics;
means for inscribing an information track on said disk along a spiral;
means for controlling said inscribing means in accordance with video signals, so that an integral number of frames is recorded during one revolution of said disk;
means for recording first audio signals during a blanking period for a period of time approximately equal to $10/n$ microseconds, with "$n$" being an integer unequal to 3, 5, and 7, the number of frames recorded per revolution, and any integral multiple thereof; and
means for recording audio signals again for a similar period of time and commencing 63.5 microseconds after termination of recording of said first audio signals.

15. In a recording system which uses a rotating disk capable of storing information as permanent modulation of its characteristics:
means for inscribing an information track on said disk along a spiral;
means for controlling said inscribing means in accordance with video signals, so that an integral number of frames is recorded during one revolution of said disk;
a source of sync and blanking pulses;
means for forming audio signal pulses; and
means operated in synchronism with the pulses from said source for recording audio signal pulses on said track when no video camera signal is being recorded, with two succeeding audio signal pulse recordings being delayed by a period of time which is composed of sync pulse frequency periods and audio signal pulse duration.

16. A system for recording video and audio information on a disk, comprising:
means for recording an odd number of video frames including control pulses on said disk along a spiral track portion of 360° arc length thereon; and
means for recording audio signals on said track during selected time intervals within periods of time allotted to the recording of horizontal control pulses sequential time intervals as selected follow each other at a period different from the period in between succeeding blanking pulse periods by the duration of at least one selected time interval.

17. In a system for reproducing audio information stored on a disk wherein audio and video signals are stored on a common track, the combination comprising:
means for detecting selected time intervals within the recorded horizontal control pulse periods as recorded on said track sequential time intervals as selected follow each other at a period different from the periods in between succeeding blanking pulse periods by the duration of at least one selected time interval; and
means connected to said detecting means and being responsive to audio signal recordings during said selected time intervals only.

18. A system for recording audio and video information on a disk capable of storing received information, comprising:
means for inscribing a spiral track on said disk;
means for feeding video signals to said inscribing means for recording on said spiral track; and
means for feeding audio signals to said inscribing means for recording in said spiral track during selected time intervals within horizontal blanking-pulse periods.

19. A system for recording audio and video information on a disk capable of storing received information, comprising:
means for inscribing a spiral track on said disk;
means for feeding video signals to said inscribing means for recording on said spiral track, there being one video frame recorded during one revolution of said disk;
automatic time interval selection means defining time intervals during and within and shorter than the video blanking periods sequential time intervals as selected follow each other at a period different from the period in between succeeding blanking pulse periods by the duration of at least one selected time interval; and
means connected to said selection and said inscribing means, for causing audio recordings during selected time intervals within blanking periods on the same track.

20. A system for retrieving audio information from a track inscribed on a disk and containing audio and video recordings, the combination comprising:
means responsive to the recorded blanking pulses and producing control signals indicative thereof;
counting means responsive to said control signals and producing enabling signals indicative of selected time intervals within succeeding blanking-pulse periods sequential time itnervals as selected follow each other at a period different from the period in between succeeding blanking pulse periods by the duration of at least one selected time interval; and
means enabled by said enabling signals for receiving recorded audio signals.

References Cited

UNITED STATES PATENTS

| | | | |
|---|---|---|---|
| 2,671,130 | 3/1954 | Weighton ----------- | 178—5.6 |
| 3,157,739 | 11/1964 | Okamura ----------- | 178—6.6 |

ROBERT L. GRIFFIN, *Primary Examiner.*

JOHN W. CALDWELL, *Examiner.*

H. W. BRITTON, *Assistant Examiner.*